US012647007B2

(12) United States Patent
Kolehmainen et al.

(10) Patent No.: US 12,647,007 B2
(45) Date of Patent: Jun. 2, 2026

(54) METHOD FOR ASSEMBLING A MAGNETIC POLE ELEMENT FOR A ROTOR FOR AN AXIAL FLOW ELECTRIC MACHINE

(71) Applicants: RENAULT S.A.S., Boulogne Billancourt (FR); WHYLOT, Cambes (FR)

(72) Inventors: Jere Kolehmainen, Saint-Aubin-lès-Elbeuf (FR); Loic Mayeur, St Santin (FR)

(73) Assignees: AMPERE S.A.S., Boulogne-Billancourt (FR); WHYLOT, Cambes (FR)

( * ) Notice: Subject to any disclaimer, the term of this patent is extended or adjusted under 35 U.S.C. 154(b) by 798 days.

(21) Appl. No.: 18/018,485

(22) PCT Filed: Jul. 20, 2021

(86) PCT No.: PCT/EP2021/070301
§ 371 (c)(1),
(2) Date: Jan. 27, 2023

(87) PCT Pub. No.: WO2022/023128
PCT Pub. Date: Feb. 3, 2022

(65) Prior Publication Data
US 2023/0299651 A1 Sep. 21, 2023

(30) Foreign Application Priority Data
Jul. 29, 2020 (FR) ....................................... 2007988

(51) Int. Cl.
*H02K 15/035* (2025.01)
*H02K 1/2796* (2022.01)
(52) U.S. Cl.
CPC ......... *H02K 15/035* (2025.01); *H02K 1/2796* (2022.01)

(58) Field of Classification Search
CPC ...... H02K 15/03; H02K 15/035; H02K 21/24; H02K 16/02; H02K 16/04
See application file for complete search history.

(56) References Cited

U.S. PATENT DOCUMENTS

| | | | |
|---|---|---|---|
| 3,979,619 | A | 9/1976 | Whiteley |
| 2011/0080065 | A1 | 4/2011 | Watanabe et al. |
| (Continued) | | | |

FOREIGN PATENT DOCUMENTS

| | | |
|---|---|---|
| CN | 102088215 A | 6/2011 |
| CN | 103795166 A | 5/2014 |
| (Continued) | | |

OTHER PUBLICATIONS

International Search Report for PCT/EP2021/070301, mailed Aug. 10, 2021, 4 pages.
(Continued)

*Primary Examiner* — Livius R. Cazan
(74) *Attorney, Agent, or Firm* — NIXON & VANDERHYE

(57) ABSTRACT

Disclosed is a method for assembling a magnetic pole element for a rotor for an axial flow electric machine, the rotor including a body in the form of a disk having at least one housing, the magnetic pole element including a plurality of single magnets, the method including the following steps: e1) forming a first row of at least two single magnets and retaining the single magnets using a strip of adhesive material; e2) placing the first row on a support having a curvature that is equal or substantially equal to the curvature of a peripheral edge of the housing; e3) forming another row of at least two other single magnets and retaining the single magnets using another adhesive material strip; e4) placing the other row on the first row; and e5) repeating steps e3) and e4) until the magnetic pole element is assembled.

20 Claims, 6 Drawing Sheets

(56) References Cited

U.S. PATENT DOCUMENTS

| 2014/0117792 | A1 |   | 5/2014 | Naitou |
| 2014/0203679 | A1 |   | 7/2014 | Klontz et al. |
| 2020/0028393 | A1 | * | 1/2020 | Ravaud .................... H02K 1/04 |

FOREIGN PATENT DOCUMENTS

| CN |   | 106233579 | A  |   | 12/2016 |   |
| EP |   | 2 306 619 |    |   | 4/2011  |   |
| EP |   | 2306619   | A2 | * | 4/2011  | ......... H01F 41/0293 |
| JP |   | S57-107010 |   |   | 7/1982  |   |
| WO |   | WO-0217462 | A1 | * | 2/2002 | ............. H02K 1/278 |
| WO |   | 2018/172636 |   |   | 9/2018  |   |

OTHER PUBLICATIONS

Written Opinion of the ISA for PCT/EP2021/070301, mailed Aug. 10, 2021, 5 pages.
Office Action, issued in Chinese Patent Application No. 202180051880.3 dated Oct. 15, 2025.

* cited by examiner

METHOD FOR ASSEMBLING A MAGNETIC POLE ELEMENT FOR A ROTOR FOR AN AXIAL FLOW ELECTRIC MACHINE

This application is the U.S. national phase of International Application No. PCT/EP2021/070301 filed Jul. 20, 2021 which designated the U.S. and claims priority to FR FR2007988 filed Jul. 29, 2020, the entire contents of each of which are hereby incorporated by reference.

BACKGROUND OF THE INVENTION

Field of the Invention

The present invention generally relates to the field of electric machines.

It relates more specifically to the assembly of a magnetic pole element for a rotor for an axial flow electric machine.

The invention has a particularly advantageous application in electric engines for electric of hybrid motor vehicles.

Description of the Related Art

An axial flow electric machine generally comprises two stators and one rotor, air gaps separating these two types of elements. The rotor carries a series of permanent magnets, while a series of coils is carried by the stators. When the coils are powered by an electric current, the rotor, which is secured to the output shaft of the engine, is subjected to a torque resulting from the magnetic field (the magnetic flow created being an axial flow for an axial flow electric machine).

To reduce the energy losses by Foucault currents in the rotor, and thus increase the performance of the electric machine, the permanent magnets can comprise a plurality of single magnets of reduced size. Indeed, a magnet is subjected to losses by Foucault currents greater than its equivalent in small single magnets. The single magnets are arranged closely to maximise the volume of magnetic material with respect to the volume of the corresponding magnetic pole element and thus improve the performance of the electric machine.

For example, a structure comprising single magnets in the form of a polyhedron is known from document WO2018172636. These single magnets have the advantage of being able to form a close network, in this case, a honeycomb structure, while having a strong magnetic field.

However, filling the volume of the magnetic pole element with the maximum number of single magnets while limiting the manufacturing costs is complex. Indeed, for example, permanent magnets often have at least one non-rectilinear side on the periphery of the body of the rotor so as to increase the volume occupied by the permanent magnets. Arranging single magnets to follow this non-rectilinear side thus generates empty spaces which decreases the magnetic efficiency of the magnetic pole element and therefore of the rotor.

SUMMARY OF THE INVENTION

In order to overcome the abovementioned disadvantages of the state of the art, the present invention proposes a geometry and an arrangement of single magnets simplifying the manufacture in series.

More specifically, according to the invention, a method for assembling a magnetic pole element for a rotor for an axial flow electric machine is proposed, said rotor comprising a body in the form of a disk centred on an axis of rotation and extending into a main plane, said body having at least one housing, said magnetic pole element comprising a plurality of single magnets, said method comprising the following steps:

- e1) forming a first row of at least two single magnets and retaining single magnets of said first row using a strip of adhesive material;
- e2) placing said first row on an assembly support having a curvature equal or substantially equal to the curvature of a peripheral edge of the housing about the axis of rotation, such that the single magnets of said first row are placed along a first line which is comprised in an assembly plane and has a non-zero curvature;
- e3) forming another row of at least two other single magnets and retaining single magnets of said other row using another strip of adhesive material;
- e4) placing said other row on said first row, such that the single magnets of said other row are placed along another line which is comprised in said assembly plane and has a non-zero curvature;
- e5) repeating steps e3) and e4) until the magnetic pole element is assembled.

This method makes it possible to arrange the single magnets, such that they are placed along lines having non-zero curvatures with respect to the axis of rotation. The magnetic pole element assembled by this method therefore has both a good resistance to mechanical stresses and good magnetic performance. In addition, this method enables a manufacture in series, at a lesser cost.

In addition, placing the single magnets along a line, the curve of which is non-zero makes it possible to follow a non-rectilinear profile. For example, the first line can be located at a peripheral part of the housing, the curvature of which is substantially equal to the outer curvature of the body. This makes it possible to decrease the maximum force undergone by a single magnetic taken independently. In other words, the centrifugal and magnetic forces are best distributed over all the single magnets, and the risk of detachment of a single magnet is less. The resistance of the rotor to the centrifugal force is thus increased.

Other advantageous and non-limiting features of the method according to the invention, taken individually or according to all the technically possible combinations, are as follows:

- said assembly support is a distinct part of said body and in step e5), said magnetic pole element is inserted in said housing;
- in step e5), said magnetic pole element is inserted such that said assembly plane is parallel to said or combined with said main plane;
- the insertion of said magnetic pole element in said housing is preceded by a step for rectifying the side edges of said magnetic pole element;
- the assembly support belongs to said housing and said assembly plane is parallel to said or combined with said main plane;
- said method comprises the following step: e6) compressing the magnetic pole element in the main plane and towards the periphery of the housing;
- said method comprises the following step: e7) fixing the magnetic pole element in the housing by injecting a bonding material coating said single magnets;
- said method comprises a prior step of producing said single magnets by sectioning a magnet block into substantially identical single magnets in the form of a rectangular parallelepiped, extending, in their largest dimension, in a main direction and in another dimension, in a transverse direction orthogonal to the main direction;

the magnetic pole element is placed or inserted in said housing, such that the main directions of said single magnets are oriented about the axis of rotation and the transverse directions are oriented tangentially to said first line or to said other lines;

the width of the strip of adhesive material is smaller than the length of the single magnets along the main direction.

Arranging magnets in the form of a rectangular parallelepiped as described above generates small, free spaces distributed homogenously in the magnetic pole element. These free spaces increase penetration, i.e. in this case, improve the filling, with a bonding material, for example a glue or a varnish, which enables the cohesion of the single magnets.

The invention also relates to a rotor such as defined in the introduction, wherein at least some of the single magnets have a rectangular parallelepiped form and are placed side-by-side along a first line and a second line which are adjacent, which are comprised in the main plane and which have average, non-zero curvatures about the axis of rotation, and in that the single magnets placed along the first line are separated from the single magnets placed along the second line by a strip of adhesive material.

Thus, thanks to the invention, the magnetic pole element comprises single magnets in the form of a rectangular parallelepiped. These single magnets are simple to manufacture in series. Indeed, it suffices, for example, to crack or cut a block along only two directions. By their rectangular parallelepiped form, the single magnets are easily arrangeable to the side of one another.

Other advantageous and non-limiting features of the rotor according to the invention, taken individually or according to all the technically possible combinations, are as follows:

said single magnets are coated with a bonding material;

all the single magnets of the plurality of single magnets have a form of a rectangular parallelepiped and are distributed over several lines;

the curvature of the line closest to the periphery of the body is substantially equal to the peripheral curvature of the housing;

the curvature of each line is a circular arc;

the single magnets in the form of a rectangular parallelepiped are substantially identical; and the single magnets extend, in their largest dimension, in a main direction and in another dimension, in a transverse dimension orthogonal to the main direction, wherein the main directions of said single magnets are oriented about the axis of rotation and wherein the transverse directions are oriented tangentially to the first line.

Naturally, different features, variants and embodiments of the invention can be associated with one another according to various combinations, insofar as they are not incompatible or exclusive to one another. In particular, in a variant, first the magnets are glued together to form a magnet pole, then the magnet pole is compressed in the structure of the rotor, for example by bracing.

BRIEF DESCRIPTION OF THE DRAWINGS

The following description regarding the accompanying drawings, given as non-limiting examples, will make it understood what the invention consists of, and how it can be achieved.

4

Figure 1:
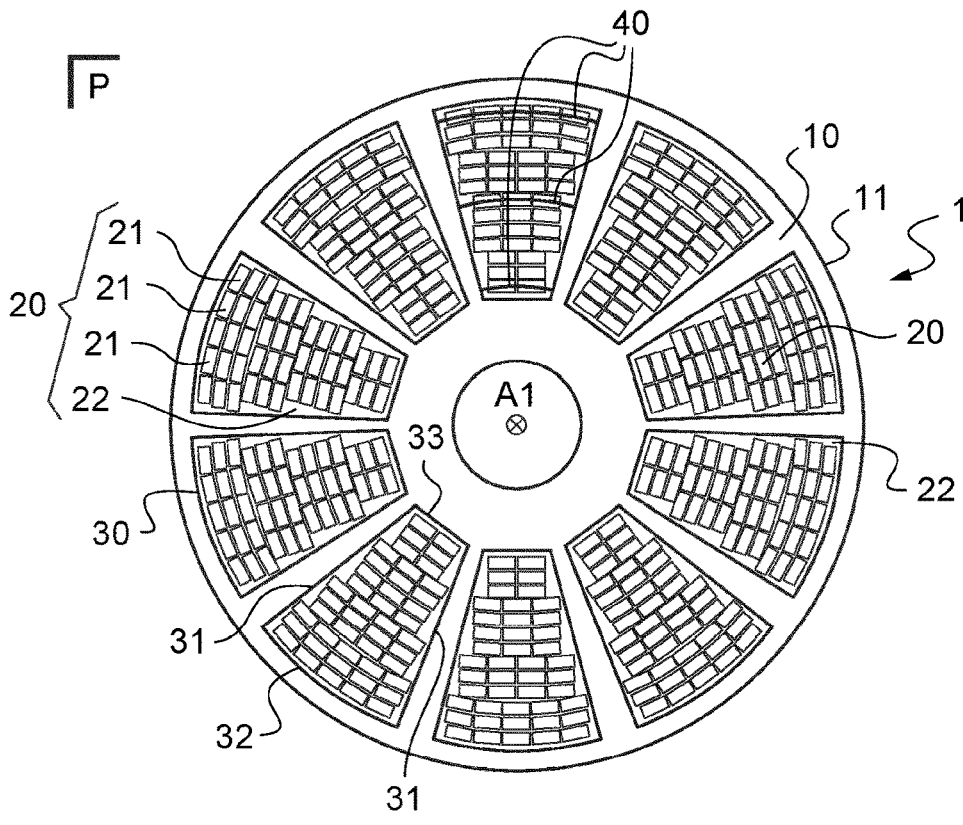
Figure 2:
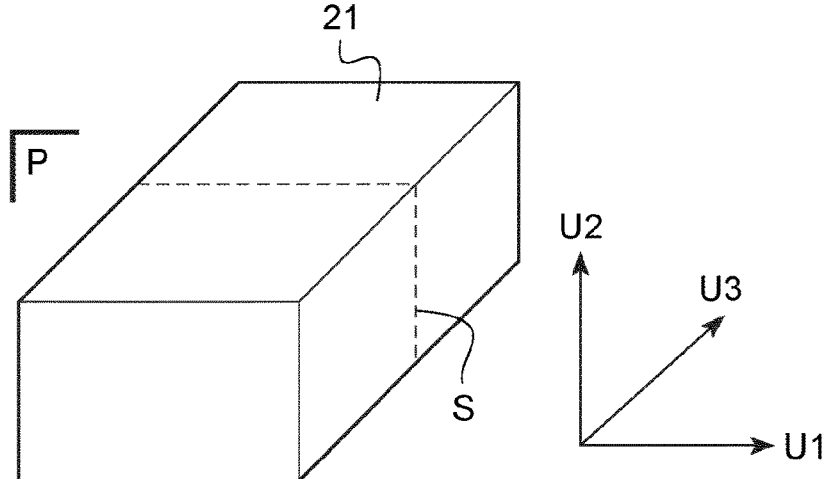
Figure 3:
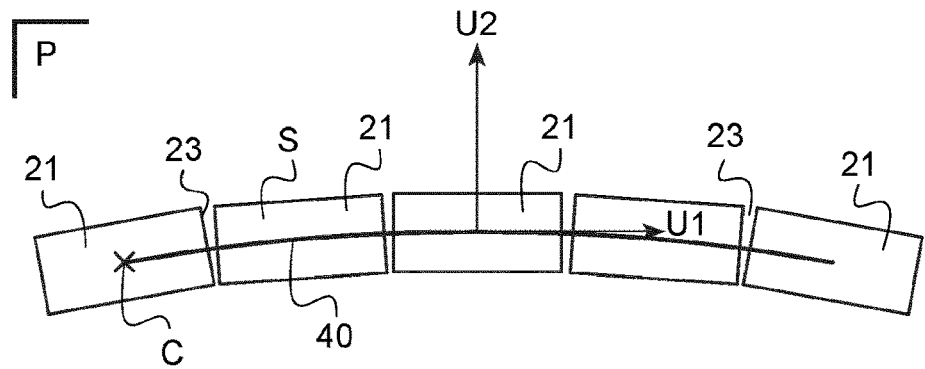
Figure 3:
Figure 4:
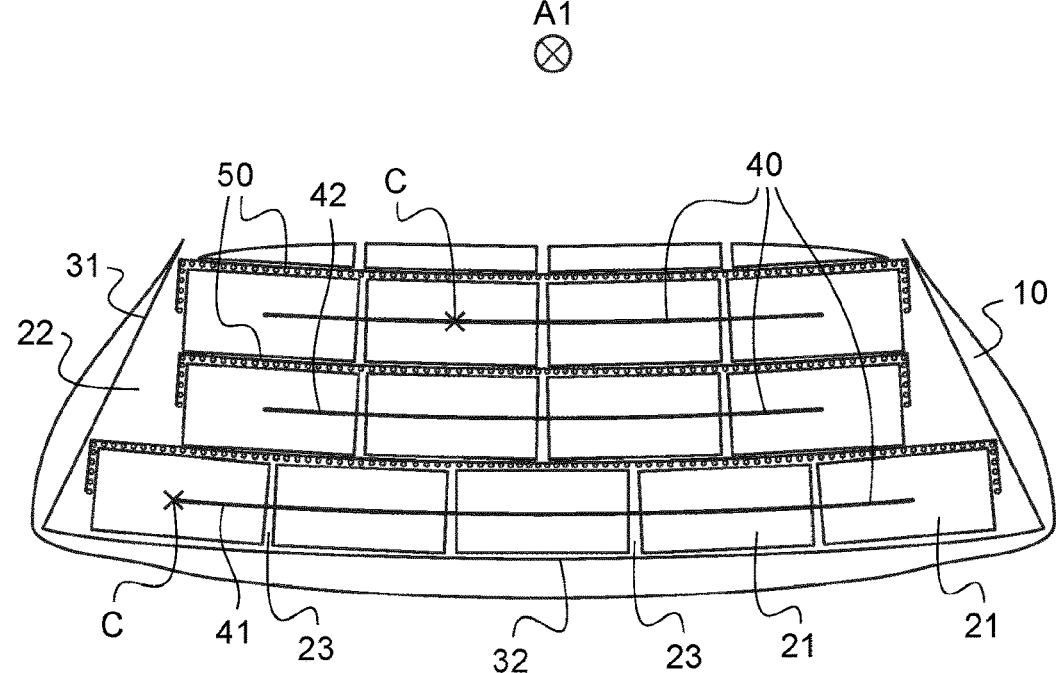
Figure 5:
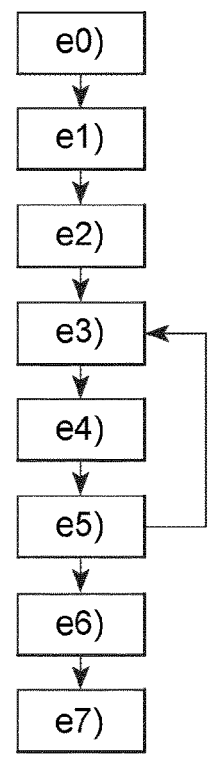
Figure 6:
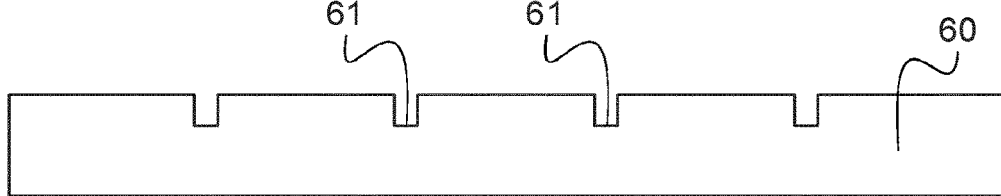
Figure 7:
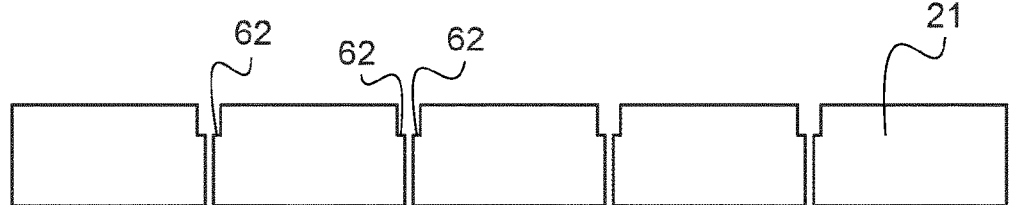
Figure 8:
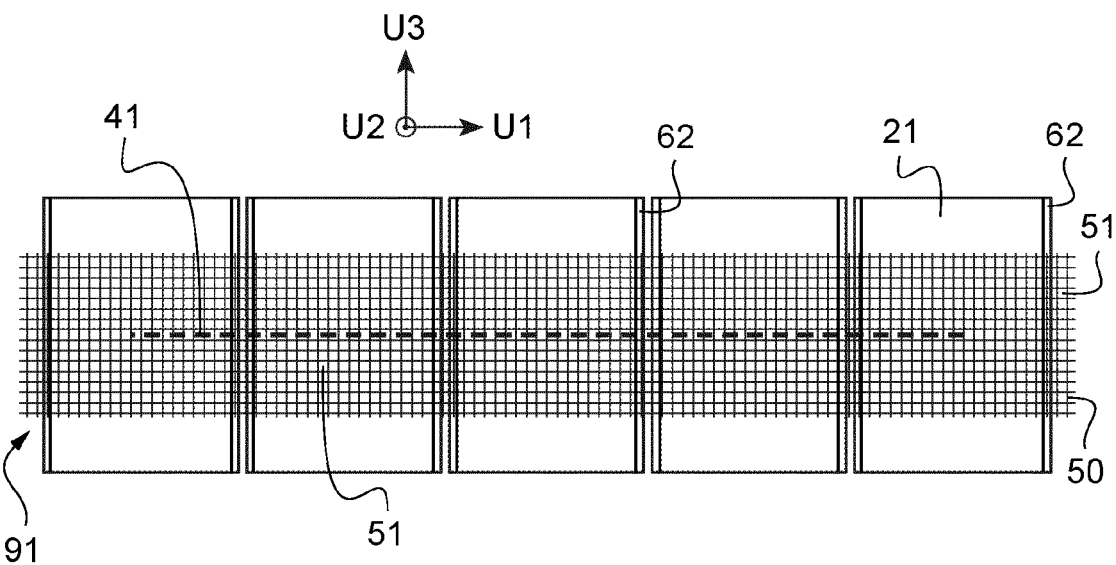
Figure 9:
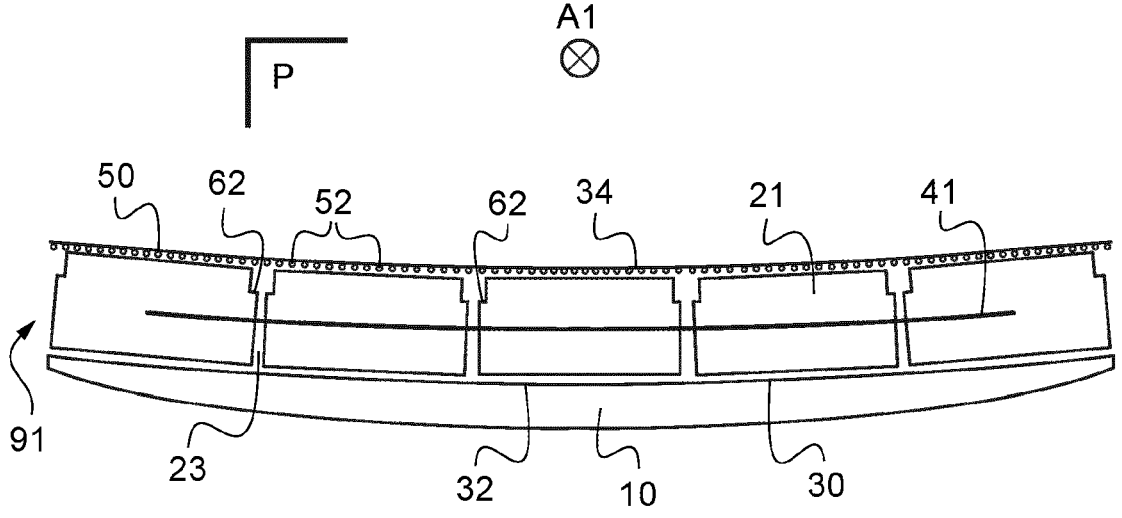
Figure 10:
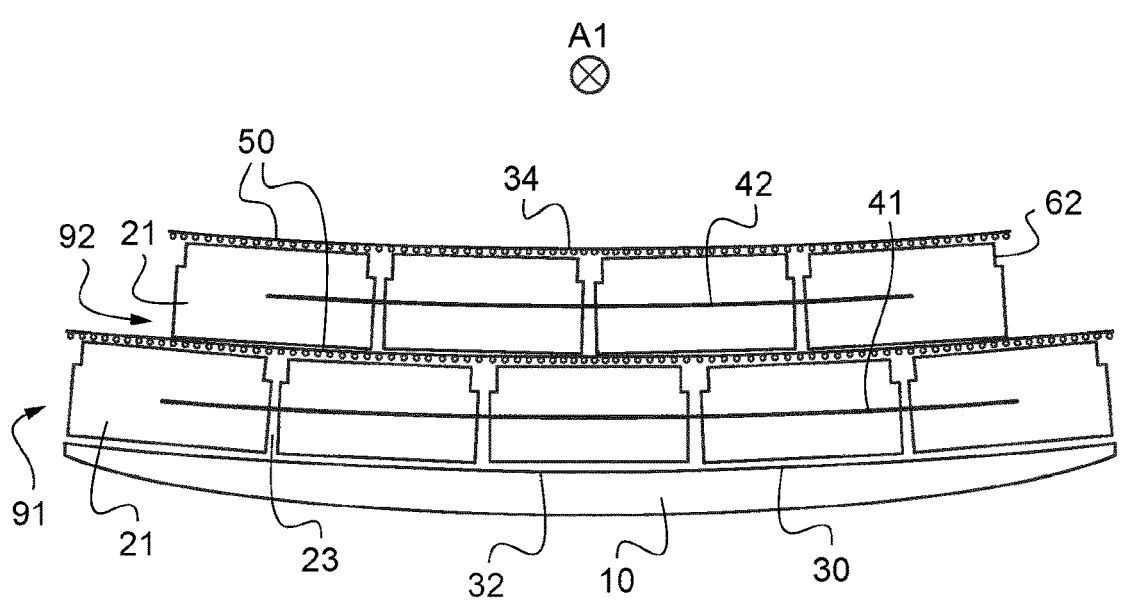
Figure 11:
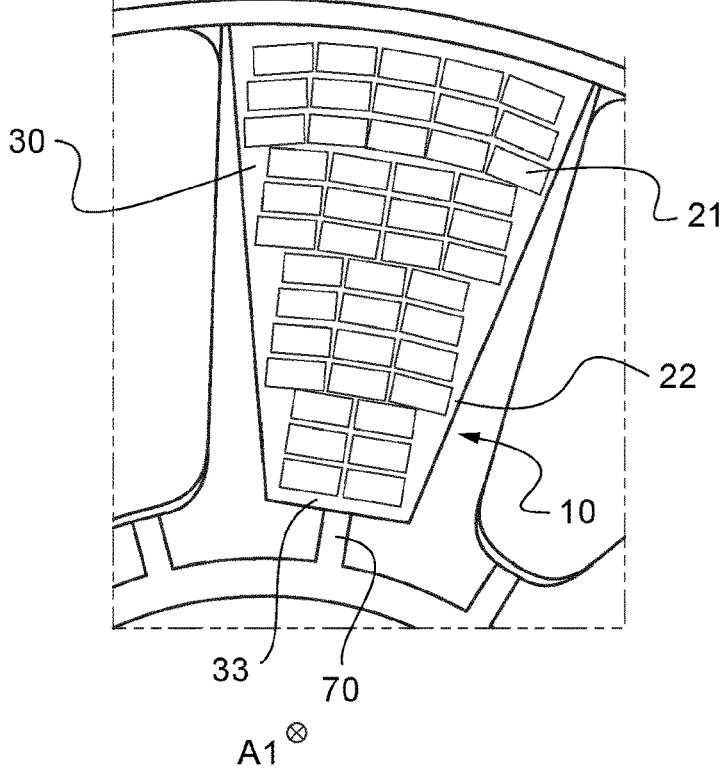
Figure 12:
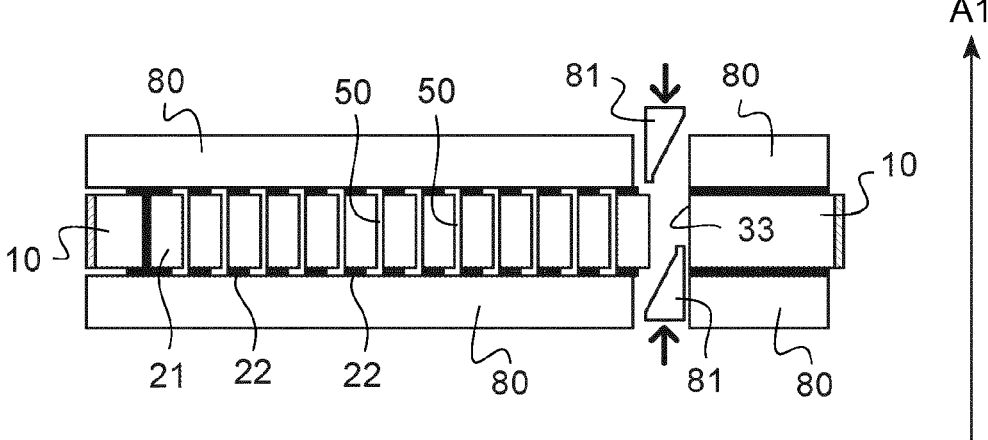
Figure 13:
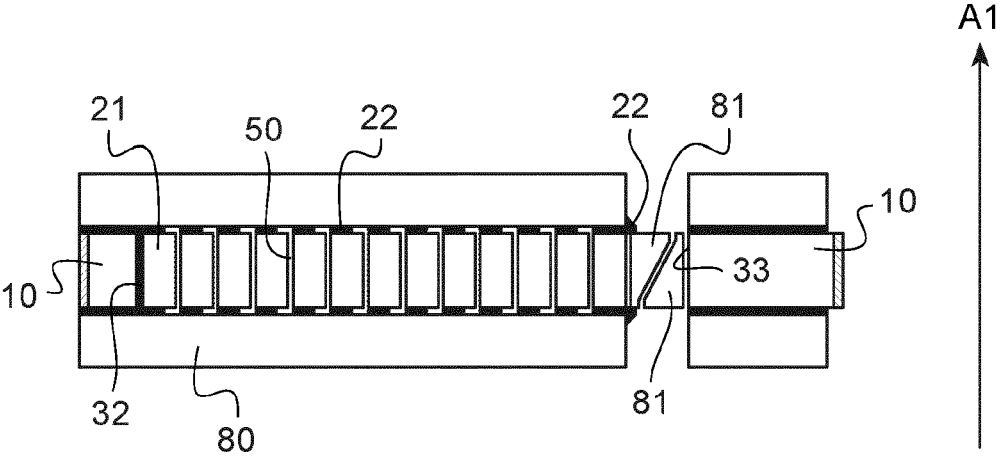

In the accompanying drawings:

FIG. 1 is a schematic, cross-sectional view, in a main plane, of a rotor assembled according to the invention comprising permanent magnets;

FIG. 2 is a schematic, perspective view of a single magnet of the rotor of FIG. 1;

FIG. 3 is a schematic, cross-sectional view of single magnets of FIG. 1, placed along a line;

FIG. 4 is a schematic, cross-sectional view of a peripheral part of a variant of an embodiment of a magnetic pole element of the rotor of FIG. 1;

FIG. 5 is a block diagram of a sequence of steps of an assembly method according to the invention, enabling the assembly of a magnetic pole element within a rotor;

FIG. 6 is a schematic, cross-sectional view of a magnet block intended for the forming of a variant of the single magnets of FIG. 1;

FIG. 7 schematically illustrates a step of the method of FIG. 5, wherein single magnets are manufactured from the magnet block of FIG. 6;

FIG. 8 schematically illustrates a step of the method of FIG. 5, wherein a row of single magnets is formed;

FIG. 9 schematically illustrates a step of the method of FIG. 5, wherein single magnets are inserted in a housing of the rotor of FIG. 1;

FIG. 10 schematically illustrates another step of the method of FIG. 5, wherein single magnets are inserted in a housing of the rotor of FIG. 1;

FIG. 11 schematically illustrates a step of the method of FIG. 5, wherein a bonding material is injected;

FIG. 12 is a schematic, cross-sectional view of single magnets before compression; and FIG. 13 schematically illustrates a step of the method of FIG. 5, wherein the single magnets are compressed.

DESCRIPTION OF THE PREFERRED EMBODIMENTS

In FIG. 1, a rotor 1 for an axial flow machine comprising a body 10 and a plurality of magnetic poles 20 is represented.

The body 10 has an overall disk form, in this sense that it is substantially circumscribed to a cylinder of revolution about an axis, below called axis of rotation A1. The body 10 extends into a main plane P orthogonal to the axis of rotation. The main plane P is, in this case, the plane of FIG. 1. The body 10 has a height (dimension of the body about the axis of rotation A1) which is a lot less than the diameter. This height is called thickness of the body 10. The body 10 thus has two flat circular faces, parallel to one another and to the main plane P, and perpendicular to the axis of rotation A1 of the rotor 1. The main plane P is, in this case, located equidistantly from the two circular faces.

As FIG. 1 shows, the body 10 has a central recess adapted to receive a transmission shaft extending along the axis of rotation A1. The rotor 1 is provided to be fixed to this transmission shaft that it is intended to drive.

The body 10 can, for example, be made of an aluminium, steel, iron, titanium base, or an alloy containing these metals, all antimagnetic. It is, for example, made by a stack of metal sheets of a thickness less than or equal to one millimetre. These sheet plates are, in this case, curved and stacked radially. They extend over the whole height of the body 10. The body 10 is however made of composite material reinforced with glass or carbon fibres.

As shown in FIG. 1, the body 10 has a plurality of recessed housings 30. In this case, the body 10 has ten identical housings 30. The housings 30 are distributed regularly, with constant angular spacing, about the axis of rotation A1. This makes it possible to ensure a good balance of the rotor 1 when it is in rotation.

Each housing 30 preferably extends over the whole thickness of the body 10. This has the advantage of providing two opposite work surfaces. Such a rotor 1 can thus, for example, be framed by two stators to provide more mechanical power.

As shown in FIG. 1, each housing 30 has a mainly trapezoidal form, with two side edges 31 of substantially radial extension, a peripheral edge 32 and an inner edge 33. In this case, the two side edges 31 are rectilinear.

The peripheral edge 32 is curved, in this case. In the main plane P, the peripheral edge 32 defines a circular arc, the bend radius of which is substantially equal to the bend radius of the periphery 11 of the body 10.

The inner edge 33 can be rectilinear, as illustrated in FIG. 1, or curved, for example to be adapted to the central recess of the body 10.

Generally, each magnetic pole element 20 has an identical form, in negative, to that of the housing 30, wherein it is inserted. As shown in FIGS. 1 and 2, each magnetic pole element 20 is therefore, in this case, of mainly trapezoidal form. The thickness of each magnetic pole element 20 (dimension about the axis of rotation A1) is substantially equal to the thickness of the body 10.

As shown in FIG. 1, each magnetic pole element 20 comprises a plurality of single magnets 21. The dimensions of the single magnets 21 are broadly less than the dimensions of the magnetic pole element 20. Thus, in this case, each magnetic pole element 20 comprises several tens of single magnets 21. In a variant, a magnetic pole element can comprise one or more hundreds of single magnets.

In this case, at least some of the single magnets 21 have a rectangular parallelepiped form and are placed side-by-side along a first line 41 and a second line 42 which are comprised in the main plane P and which have an average, non-zero curvature about the axis of rotation A1. A single magnet 21 is, for example, represented in FIG. 2.

As shown in FIG. 4, the single magnets 21 placed along two adjacent lines 40 are separated by a strip of adhesive material 50. In this case, two lines are adjacent when they are located in an immediate vicinity, one above the other. For example, in FIG. 4, the first line 41 and the second line 42 are adjacent. In this case, a line therefore has another or two adjacent lines. This means that the single magnets 21 of two consecutive rows, with respect to the axis of rotation A1, are separated by a strip of rigid adhesive material 50.

The adhesive material is typically a band of a glass or carbon fibre mesh covered with glue on one of its faces or on its two faces. The strip of adhesive material 50 is simply called adhesive strip 50 below.

As illustrated in FIG. 3, the fact that a line 40 has an average, non-zero curvature, means that the line 40 is not rectilinear. The fact that the average curvature of the line 40 is non-zero about the axis of rotation A1 means, in this case, that the line 40 has a concavity oriented towards the axis of rotation A1. Generally, this means that the line 40 is curved about the axis of rotation A1.

By "placed along a line", this means that at least one part of a single magnet 21 is located on the line 40. In this case, as illustrated in FIG. 3, the part of a single magnet 21 being located on the line 40 is preferably the centre C of the section S of the single magnet 21 in the main plane P.

The magnetic pole element 20 also comprises a bonding material 22 which ensures the cohesion between the single magnets 21. In this case, the bonding material 22 coats the single magnets 21. The bonding material 22 is, for example, a composite plastic resin, a glue or a varnish.

In this case, as shown in FIG. 1, all the single magnets 21 have a rectangular parallelepiped form. In addition, all of the single magnets 21 are distributed over several lines 40. All the lines 40 are, in this case, comprised in the main plane P.

In addition, all the single magnets 21 are substantially identical. This facilitates their manufacture in series. By substantially, this means that a tolerance of 5 to 10% is permitted over the differences of dimensions and of directions between each single magnet, the single magnets being, for example, manufactured by sectioning of a large magnet block, this sectioning being obtained by cracking or sawing.

The single magnets 21 placed side-by-side along a line 40 form a row of single magnets 21. Thus, for example, the magnetic poles 20 of FIG. 1 comprise thirteen rows of single magnets 21 placed along thirteen lines 40, only one part of which is referenced in FIG. 1.

As shown in FIGS. 3 and 4, this placing of the single magnets forms free spaces 23 between the single magnets 21. The free spaces 23 are mainly in the form of a profiled triangular prism parallel to the axis of rotation A1. The free spaces 23 enable a better penetration of the bonding material 22 between the single magnets 21. The triangular prism form, in particular gives a particular cohesion to the single magnets 21 against the centrifugal forces when the rotor 1 is in rotation thanks to this better penetration of the bonding material 22.

As illustrated in FIG. 2, a single magnet 21 in the form of a rectangular parallelepiped has six equal faces, two-by-two, and all the angles between the faces are right angles. A single magnet 21 defines three directions U1, U2, U3 orthogonal to one another. Each direction U1; U2; U3 is perpendicular to a pair of opposite sides.

As shown in FIG. 2, the permanent magnets 21 extend in a main direction U3 defined by their larger dimension. For example, in this case, the single magnets 21 extend in the direction U3. The two other directions U1, U2 are, in this case, called transverse directions U1, U2. For example, in this case, the dimension of the single magnets 21 in the main direction U3 is around twice larger than the dimension in a transverse direction U1 and around four times larger than the dimension in the other transverse direction U2. In this case, the three directions U1, U2, U3 define an orthogonal marker.

In this case, the main directions U3 of the single magnets 21 are oriented about the axis of rotation A1. This means that the transverse directions U1, U2 are parallel to the main plane P. The transverse directions U1, U2 are even, in this case, more specifically comprised in the main plane P. In this case, the main dimension U3 of a single magnet 21 is substantially equal to the thickness of the body 10. In this orientation, a single magnet 21 therefore extends from one circular face to the other of the body 10.

This orientation of the single magnets 21 ensures an increased rigidity of the magnetic pole element 20 about the axis of rotation A1, once the single magnets 21 are taken in the bonding material 22. Indeed, in this orientation, each single magnet 21 is fixed by a large part of its surface, and in addition, along a surface parallel to the stresses being exerted about the axis of rotation. Thanks to this orientation, it is not necessary to sandwich the rotor 1 between retaining disks which makes it possible to reduce the size of the air gaps and to improve the performance of the electric machine.

In addition, one of the two transverse directions U1, U2 is, in this case, tangent to the line 40 along which the single magnets 21 are placed. This means in this case, as illustrated in FIG. 3, that one of the two transverse directions U2 is orthogonal to the line 40 at the centre C of the section S of the single magnet 21. The other transverse direction U1 is thus tangent to the line 40 at the centre C of the section S of the single magnet 21.

The curvature of the most peripheral line is, in this case, substantially equal to the curvature of the peripheral edge 32 of the housing 30. The curvature of the lines 40 can increase or decrease, by getting close to the axis of rotation A1. The curvature of the line closest to the inner edge 33 of the housing 30 can, for example, be substantially equal to the curvature of the latter. This curvature can, for example, correspond to the curvature of the central recess. The curvature of the lines can also remain constant.

The single magnets 21 placed along the most peripheral line are located against the peripheral edge 32 of the housing 30, except the bonding material 22. This row of single magnets 21 therefore follows the non-rectilinear form of the peripheral edge 32, which mainly limits the loss of space.

In this case, the curvature of each line 40 is more specifically a circular arc.

As shown in FIG. 4, it can be provided that the adhesive strip 50 is longer than a row of single magnets 21. The single magnets 21 located at the ends of the rows are thus separated, at least partially, from the side edges 31 using the adhesive strip 50.

The adhesive material 50 comprises, for example, a glass fibre structure forming a strip, the two faces of which are impregnated with a glue. More generally, the adhesive material 50 is, in this case, a double-face adhesive strip. The width of the adhesive strip 50 along the main direction U3 is preferably smaller than the length of the single magnets 21 along the main direction U3. It is, for example, less than at least 20% of the length of the single magnets. This makes it possible for the bonding material 22 to sufficiently coat the single magnets 21, in particular when the bonding material 22 hardly penetrates around or through the adhesive strip 50. The rotor 1 is thus more resistant during its rotation. However, as shown in FIGS. 12 and 13, it is also possible to use an adhesive strip wider than the length of the single magnets along the direction U3. In this case, the adhesive strip is curved over the surfaces of the single magnets 21 at the circular faces of the body 10.

As shown in FIG. 8, the structure of the adhesive material 50 forms, in this case, a mesh defining pores 51. As shown in FIGS. 9 and 10, the adhesive material 50 comprises, in this case, reliefs 52 on one of its two faces. The pores 51 and the reliefs 52 enable a better penetration of the bonding material 22 between the single magnets 21. To ensure a good penetration of the bonding material 22, the thickness of the reliefs 52 and therefore of the adhesive material 50 is between 1% to 15% of the dimension of a single magnet 21 in the transverse direction U2.

Preferably, when the adhesive strip 50 is curved over the surfaces of the single magnets 21 at the circular faces of the body 10, the mesh of the adhesive strip 50 enables the bonding material 22 to penetrate over at least one thickness mesh when the thickness of the adhesive strip 50 is two meshes or more.

Now, using FIGS. 5 to 13, a method for assembling such a magnetic pole element 20 is described.

FIG. 5 illustrates a method for assembling a magnetic pole element 20 within the rotor 1. This method comprises the following steps:

e1) forming a first row 91 of at least two single magnets 21 and retaining single magnets 21 of the first row 91 using a strip of adhesive material 50; e2) placing the first row 91 on an assembly support having a curvature equal or substantially equal to the curvature of a peripheral edge 32 of the housing 30 about the axis of rotation A1 such that the single magnets of said first row 91 are placed along a first line 41 comprised in an assembly plane and having a non-zero curvature;

e3) forming another row 92 of at least two other single magnets 21 and retaining single magnets 21 of the other row 92 by using another strip of adhesive material 50;

e4) placing the other row 92 on the first row 91, such that the single magnets of the other row 92 are placed along another line 42 comprised in the assembly plane and having a non-zero curvature;

e5) repeating steps e3) and e4) until the magnetic pole element 20 is assembled.

In this case, "placing on" means that a row is placed in contact with or against the assembly support or another row. In this case, for example, the other row 92 is placed in contact with the adhesive strip 50 of the first row 91.

In this case, in step e5), during repetitions of steps e3) and e4), each new row is placed on the preceding row, the preceding row being the row placed in the preceding step e4). Thus, for example, a third row is placed on a second row and is therefore not in contact with the first row. The other rows are thus stacked on the first row, then on top of one another. Advantageously, the adhesive strip thus enables the retaining of the different rows against one another.

In an embodiment (not represented in the Figures), the assembly support is a distinct part of the body 10. The assembly of the magnetic pole element 20 is thus carried out outside of the housing 30. In step e5), the magnetic pole element 20 is thus inserted in the housing 30.

The assembly support is thus designed such that the curvature of the surface over which the first row 91 is placed, is equal or substantially equal to the curvature of the peripheral edge 32 of the housing 30. By substantially equal, this means equal with a tolerance of 0 to 5%, i.e. in this case, equal to almost 5% maximum to the curvature of the peripheral edge 32 of the housing 30. The surface of the assembly support on which the first row 91 is placed, therefore has a form similar to the peripheral edge of the housing 30.

In this case, the assembly plane is orthogonal to the surface of the assembly support on which the first row 91 is placed. The lines along which the rows are placed are all comprised in the assembly plane.

In this case, in step e5), the magnetic pole element 20 is inserted such that the assembly plane is parallel to the main plane P or combined with the latter.

The step of inserting in the housing is optionally preceded by a step of rectifying the edges of the rows of magnets such that the magnetic pole element has side edges corresponding to the side edges of the housing. This makes it possible to produce magnetic pole elements evenly and optimally filling the housing. The rectification step uses, for example, a water saw or a circular saw. In this case, the rectification step is therefore a machining step.

FIGS. 6 to 13 illustrate an embodiment, wherein the support belongs to the housing 30, such that the assembly of the magnetic pole element 20 is carried out within the housing 30. The assembly plane is thus parallel to the main plane P or combined with the latter.

In this case, the assembly support is more specifically the peripheral edge 32. The assembly method illustrated in FIGS. 6 to 13 thus comprises the following steps:

e1) forming a first row 91 of at least two single magnets 21 in the form of a rectangular parallelepiped and retaining the single magnets 21 of this row using an adhesive strip 50;

e2) inserting the first row 91 in the housing 30 at the periphery of the housing 30, such that the single magnets 21 of the first row 91 are placed along a first line 41 comprised in the main plane P and having a non-zero curvature about the axis of rotation A1;

e3) forming another row 92 of at least two other single magnets 21 in the form of a rectangular parallelepiped and retaining magnets of the other row 92 using another adhesive strip 50;

e4) inserting the other row 92 in the housing 30 at a free part 34, such that the single magnets 21 of the other row 92 are placed along another line 42 comprised in the main plane P and having a non-zero curvature about the axis of rotation A1;

e5) repeating steps e3) and e4) until the magnetic pole element 20 is assembled.

Here, the single magnets 21 are obtained beforehand during a step e0) by the sectioning or the cracking of a magnet block 60. As shown in FIG. 6, the magnet block have grooves 61 facilitating its cracking or sectioning into single magnets 21. Once the single magnets 21 are placed in row as in FIG. 9, these grooves increase the size of the free spaces 23, which subsequently favours the penetration of the bonding material.

As shown in FIG. 7, three single magnets 21 obtained by this method thus having substantially a form of a rectangular parallelepiped with two side grooves 62 extending in the main direction U3. In the transverse directions U1, U2, the dimensions of the side grooves are, in this case, less than 10% of the length of the sides of the single magnets 21. The single magnets 21 are therefore subsequently described as having a rectangular parallelepiped form.

Step e1) is illustrated in FIG. 8. In FIG. 8, a first row 91 of five identical single magnets 21 are placed to the side of one another. The row of single magnets 21 is, in this case, rectilinear.

As shown in FIG. 8, it is in addition provided that the single magnets 21 are connected together using an adhesive strip 50 such as described above. The adhesive strip 50 makes it possible to easily manipulate the row of single magnets 21, in particular during the step e2). During step e1), the adhesive strip is positioned, for example, on single magnets 21 aligned on a plane support.

As shown in FIG. 9, the single magnets 21 of the first row 91 are inserted in the housing 30 at the periphery of the housing 30, i.e. in this case against the peripheral edge 32 of the housing 30.

The number of single magnets 21 placed to the side of one another in step e1) is determined by the length of the peripheral edge 32. This number is preferably determined so as to place the most single magnets 21 along the peripheral edge 32.

The single magnets 21 are inserted such that the first line 41 is comprised in the main plane P. This is, for example, here the case when the single magnets 21, the largest dimension of which is substantially equal to the thickness of the body 10, extend from one circular face to the other. In other words, the row of single magnets 21 is centred, about the axis of rotation A1, in the housing 30.

Since the first row 91 of single magnets 21 is arranged against the peripheral edge 32, the first line 41 naturally has a non-zero curvature about the axis of rotation A1. In this case, the curvature of the first line 41 is substantially equal to the curvature of the peripheral edge 32. The curvature of the first line 41 describes more specifically a circular arc.

Thanks to the adhesive strip 50, and therefore to the action of manipulating the single magnets in rows, it is not necessary to use a specific tool, nor to position the single magnets 21 one-by-one in the housing 30. This facilitates their positioning and saves time.

In step e3), at least two other single magnets 21 in the form of a rectangular parallelepiped are placed to form a second row 92. The other single magnets 21 are, in this case, identical to the single magnets 21 of the first row 91.

As for the first row 91, it is in addition provided that the other single magnets 21 are connected together using an adhesive strip 50.

In this case, the first iteration of step e3) is described, during which the single magnets 21 of the second row 92 are placed along a second line 42.

In step e4), the other single magnets 21 are inserted in the housing 30 at a free part 34. As shown in FIG. 9, for the second row 92, the free part 34 is, in this case, defined by the first row 91. The free part 34 is, in this case, defined by the surfaces of the single magnets 21 of the first row 91 located opposite the peripheral edge 32. The free part 34 is, in this case, partially covered using the adhesive strip 50. Thus, two rows of single magnets are superposed easily without a specific tool. In this case, the rows are placed such that the magnetic pole element formed has a symmetry plane comprising the axis of rotation A1.

As shown in FIG. 10, during the successive iterations of steps e3) and e4), the free part 34 is defined by the surfaces of the single magnets 21 of the preceding row, located opposite the peripheral edge 32.

In step e4), the other single magnets 21 are inserted such that the other line, for example, in this case, the second line 42, is comprised in the main plane P and has a non-zero curvature about the axis of rotation A1. The curvature of a line is, in this case, non-zero, since the single magnets 21 are arranged against the preceding row.

Here, the adhesive strip 50 makes it possible to fix the second row 92 to the first row 91 when the second row is inserted in the housing 30. Generally, the adhesive strip makes it possible to fix the row which is inserted at the preceding row.

The number of single magnets 21 placed along the second line 42 is, in this case, less than or equal to the number of single magnets 21 placed along the first line 41. For example, in FIG. 10, the second row 92 comprises four single magnets 21. Generally, the number of single magnets of one line is less than or equal to the number of single magnets of the preceding row. In a variant, the number of single magnets can be greater than that of the preceding row.

For the second row 92 and the subsequent rows, the number of single magnets 21 placed to the side of one another in step e3) is determined by the length of the free part 34. This number is preferably determined to place the most single magnets 21 along the free part 34.

Steps e3) and e4) are then repeated until the housing 30 is filled with the most single magnets 21.

Whatever the embodiment, the method comprises, in this case, a step e6) of compressing the magnetic pole element 20, i.e. all of the single magnets 21 inserted in the housing 30, in the main plane P and towards the periphery of the housing 30, i.e. towards the peripheral edge 32.

Step e6) can, for example, save quite a lot of space to insert an additional row against the inner edge 33 of the housing 30.

The method also comprises a step e7) of fixing the magnetic pole element 20 in the housing 30 by one of the following methods: gluing, varnishing or thermal hardening of a filling material. During this step e7), the bonding material 22, which is therefore, for example, a glue, a varnish or a material requiring curing, is injected around the single magnets 21. As shown in FIG. 11, during step e7), the bonding material 22 is, in this case, injected in the housing 30 using an injector 70 located at the central recess of the body 10. The bonding material 22 is thus injected through the inner edge 33 of the housing 30. This injection method makes it possible to guarantee the chain of dimensions. As described above, the penetration of the bonding material 22 between the single magnets 21 is facilitated by the free space 23 between the single magnet 21 and, in this case, also by the structure of the adhesive strip 50.

In this case, step e6) is carried out during step e7). Step e6) of compressing the magnetic pole element 20 is more specifically carried out during the hardening of the bonding material 22. These steps are illustrated in FIGS. 12 and 13 representing the rotor 1 along a cross-sectional plane comprising the axis of rotation of the rotor A1.

As represented in FIG. 12, composite flanges 80 placed on either side of the body 10 sandwich the single magnets 21 in a longitudinal direction parallel to the axis of rotation A1. The bonding material 22 is thus injected between and around the single magnets 21. As shown in FIG. 13, two press elements 81 are then forcibly inserted, in the longitudinal direction, on either side of the rotor 1 between the magnetic pole element 20 and the body 10. In this case, the press elements are inserted between the single magnets and the inner edge 33 of the housing 30. The single magnets 21 are thus compressed towards the peripheral edge 32 of the housing 30. The bonding material 22 thus hardens as the single magnets 21 are compressed.

In a variant, it can be provided that coating the single magnets with the bonding material to form the magnetic pole element, then placing them in the housing and compressing them, for example by bracing.

The present invention is not at all limited to the embodiments described and represented, but a person skilled in the art will know how to provide any variant according to the invention.

The invention claimed is:

1. Method for assembling a magnetic pole element for a rotor for an axial flow electric machine, said rotor comprising a body in the form of a disk centred on an axis of rotation and extending in a main plane, said body having at least one housing, said magnetic pole element comprising a plurality of single magnets, said method comprising the following steps:

e1) forming a first row of at least two single magnets and retaining single magnets of said first row using a strip of adhesive material;

e2) placing said first row on an assembly support having a curvature that is equal or substantially equal to the curvature of a peripheral edge of the housing about the axis of rotation such that the single magnets of said first row are placed along a first line which is comprised in an assembly plane and has a non-zero curvature;

e3) forming another row of at least two other single magnets and retaining single magnets of said other row using another strip of adhesive material;

e4) placing said other row on said first row, such that the single magnets of said other row are placed along another line which is comprised in said assembly plane and has a non-zero curvature;

e5) repeating steps e3) and e4) until the magnetic pole element is assembled.

2. The method according to claim 1, wherein said assembly support is a distinct part of said body and in step e5), said magnetic pole element is inserted in said housing.

3. The method according to claim 2, wherein, in step e5), said magnetic pole element is inserted such that said assembly plane is parallel to said or combined with said main plane.

4. The method according to claim 3, wherein the insertion of said magnetic pole element in said housing is preceded by a step of rectifying the side edges of said magnetic pole element.

5. The method according to claim 3, comprising the following step:

e6) compressing the magnetic pole element in the main plane and towards the periphery of the housing.

6. The method according to claim 3, comprising the following step:

e7) fixing the magnetic pole element in the housing by injecting a bonding material coating said single magnets.

7. The method according to claim 2, wherein the insertion of said magnetic pole element in said housing is preceded by a step of rectifying the side edges of said magnetic pole element.

8. The method according to claim 7, comprising the following step:

e6) compressing the magnetic pole element in the main plane and towards the periphery of the housing.

9. The method according to claim 7, comprising the following step:

e7) fixing the magnetic pole element in the housing by injecting a bonding material coating said single magnets.

10. The method according to claim 2, comprising the following step:

e6) compressing the magnetic pole element in the main plane and towards the periphery of the housing.

11. The method according to claim 2, comprising the following step:

e7) fixing the magnetic pole element in the housing by injecting a bonding material coating said single magnets.

12. The method according to claim 1, wherein the assembly support belongs to said housing and said assembly plane is parallel to said or combined with said main plane.

13. The method according to claim 12, comprising the following step:

e6) compressing the magnetic pole element in the main plane and towards the periphery of the housing.

14. The method according to claim 12, comprising the following step:

e7) fixing the magnetic pole element in the housing by injecting a bonding material coating said single magnets.

15. The method according to claim 1, comprising the following step:

e6) compressing the magnetic pole element in the main plane and towards the periphery of the housing.

16. The method according to claim 15, comprising the following step:

e7) fixing the magnetic pole element in the housing by injecting a bonding material coating said single magnets.

17. The method according to claim 1, comprising the following step:

e7) fixing the magnetic pole element in the housing by injecting a bonding material coating said single magnets.

18. The method according to claim 1, comprising a prior step of producing said single magnets by sectioning a magnet block into substantially identical single magnets in the form of a rectangular parallelepiped, extending, in the substantially identical single magnets' largest dimension, in a main direction and in another dimension, in a transverse direction orthogonal to the main direction.

19. The method according to claim 18, wherein the magnetic pole element is placed or inserted in said housing such that the main directions of said single magnets are oriented about the axis of rotation and the transverse directions are oriented tangentially to said first line or to said other lines.

20. The method according to claim 18, wherein the width of the strip of adhesive material is smaller than the length of the single magnets along the main direction.

* * * * *